United States Patent
Fujii

(10) Patent No.: US 11,142,659 B2
(45) Date of Patent: Oct. 12, 2021

(54) CURABLE COMPOSITION, CURABLE INK, ACCOMMODATING UNIT, TWO- OR THREE-DIMENSIONAL IMAGE FORMING DEVICE, TWO-DIMENSIONAL OR THREE-DIMENSIONAL IMAGE FORMING METHOD, CURED MATTER, AND PRINTED MATTER

(71) Applicant: RICOH COMPANY, LTD., Tokyo (JP)

(72) Inventor: Hidetoshi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/516,479

(22) Filed: Jul. 19, 2019

(65) Prior Publication Data
US 2020/0032084 A1 Jan. 30, 2020

(30) Foreign Application Priority Data
Jul. 24, 2018 (JP) .............................. JP2018-138154

(51) Int. Cl.
| | |
|---|---|
| *B32B 3/10* | (2006.01) |
| *C09D 11/101* | (2014.01) |
| *C09D 11/102* | (2014.01) |
| *C09D 11/033* | (2014.01) |
| *C09D 11/30* | (2014.01) |
| *B33Y 10/00* | (2015.01) |
| *B33Y 30/00* | (2015.01) |

(Continued)

(52) U.S. Cl.
CPC .......... *C09D 11/101* (2013.01); *B29C 64/112* (2017.08); *B29C 64/209* (2017.08); *B29C 64/255* (2017.08); *B29C 64/264* (2017.08); *B33Y 10/00* (2014.12); *B33Y 30/00* (2014.12); *B33Y 70/00* (2014.12); *B41J 11/002* (2013.01); *B41M 5/0023* (2013.01); *B41M 7/0081* (2013.01); *C09D 11/033* (2013.01); *C09D 11/102* (2013.01); *C09D 11/107* (2013.01); *C09D 11/30* (2013.01); *B29K 2075/00* (2013.01)

(58) Field of Classification Search
CPC ... B29C 64/112; B29C 64/209; B29C 64/255; B29C 64/264; B29C 64/40; B29K 2075/00; B33Y 10/00; B33Y 30/00; B33Y 70/00; B41J 11/002; B41M 5/0023; B41M 7/0081; C09D 11/033; C09D 11/101; C09D 11/102; C09D 11/107; C09D 11/30
See application file for complete search history.

(56) References Cited

U.S. PATENT DOCUMENTS

| | | | | |
|---|---|---|---|---|
| 7,485,691 | B1 * | 2/2009 | Guo | ............... C07F 7/0896 528/17 |
| 2007/0276066 | A1 * | 11/2007 | Ohno | ............... C08L 33/06 524/186 |

(Continued)

FOREIGN PATENT DOCUMENTS

| | | |
|---|---|---|
| JP | 2008-223014 | 9/2008 |
| JP | 2015-091980 | 5/2015 |

(Continued)

*Primary Examiner* — Christopher M Polley
(74) *Attorney, Agent, or Firm* — Grüneberg and Myers PLLC

(57) ABSTRACT

A curable composition comprises water, a polysilane compound having a phenyl group, and at least one of a polymerizable particle and a polymerizable monomer.

20 Claims, 3 Drawing Sheets

(51) Int. Cl.
*B33Y 70/00* (2020.01)
*B29C 64/112* (2017.01)
*B29C 64/209* (2017.01)
*B29C 64/255* (2017.01)
*B29C 64/264* (2017.01)
*B41M 5/00* (2006.01)
*B41M 7/00* (2006.01)
*B41J 11/00* (2006.01)
*C09D 11/107* (2014.01)
*B29K 75/00* (2006.01)

(56) References Cited

U.S. PATENT DOCUMENTS

| | | | |
|---|---|---|---|
| 2008/0200635 A1* | 8/2008 | Nakazawa | C09D 11/30 528/42 |
| 2013/0063533 A1* | 3/2013 | Yamamoto | C09D 11/322 347/100 |
| 2015/0247044 A1* | 9/2015 | Brandstein | C09D 11/101 347/20 |
| 2015/0270485 A1* | 9/2015 | Watanabe | C09D 11/36 257/40 |
| 2019/0270901 A1* | 9/2019 | Fujii | C09D 11/30 |

FOREIGN PATENT DOCUMENTS

| | | |
|---|---|---|
| JP | 2015-529731 | 10/2015 |
| JP | 2016-186052 | 10/2016 |
| WO | WO2014/033657 A1 | 3/2014 |

\* cited by examiner

CURABLE COMPOSITION, CURABLE INK, ACCOMMODATING UNIT, TWO- OR THREE-DIMENSIONAL IMAGE FORMING DEVICE, TWO-DIMENSIONAL OR THREE-DIMENSIONAL IMAGE FORMING METHOD, CURED MATTER, AND PRINTED MATTER

CROSS-REFERENCE TO RELATED APPLICATIONS

This patent application is based on and claims priority pursuant to 35 U.S.C. § 119 to Japanese Patent Application No. 2018-138154, filed on Jul. 24, 2018, in the Japan Patent Office, the entire disclosures of which are hereby incorporated by reference herein.

BACKGROUND

Technical Field

The present invention relates to a curable composition, a curable ink, an accommodating unit, a two- or three-dimensional image forming device, a two- or three-dimensional image forming method, cured matter, and printed matter.

Description of the Related Art

Color images can be easily formed with low running cost utilizing inkjet recording methods. Therefore, the inkjet recording method has become popular.

As the ink for inkjet recording, aqueous dye ink in which dyes are dissolved in an aqueous medium or solvent-based ink in which oil-soluble dyes are dissolved in an organic solvent are used. In general, taking into account safety and environment, aqueous dyes dissolved in water or a mixture of water and a water-soluble organic solvent are used in home and office.

In addition, aqueous pigment ink in which pigment particulates are dispersed in water is now appealing. Ink for inkjet recording using a water dispersible pigment is known to have excellent water resistance and light resistance.

For example, an aqueous pigment ink has been proposed which is capable of forming an ink film having abrasion resistance by radical reaction using a pigment ink containing water as a major agent and a radical reactive polymerizable material partially having an acrylate structure has been proposed.

SUMMARY

According to embodiments of the present disclosure, provided is a curable composition which contains water, a polysilane compound having a phenyl group, and at least one of a polymerizable particle and a polymerizable monomer.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
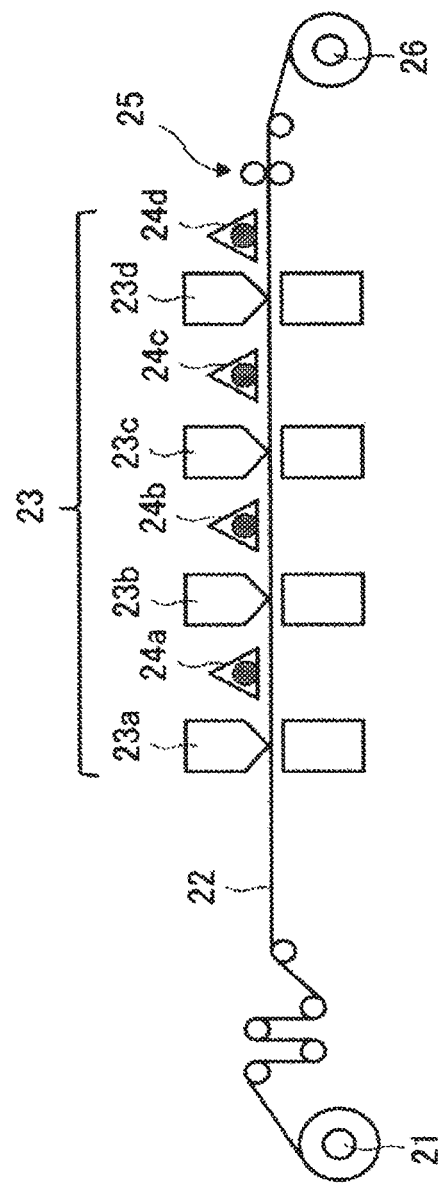
FIG. 1 is a schematic diagram illustrating an example of the image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, the curable composition which can obtain a cured film having excellent abrasion resistance, smoothness, and glossiness can be provided.

Curable Composition

The curable composition of the present disclosure contains water, a polysilane compound having a phenyl group, and a polymerizable material containing at least one of a polymerizable particle and a polymerizable monomer, and further contains other optional components.

The present inventors made an investigation about a curable composition which can obtain a cured film having excellent abrasion resistance, smoothness, and glossiness and have obtained the following knowledge.

For example, an ink containing a typical water-soluble dye involves a problem, which is that the formed recorded image is inferior in water resistance and light resistance.

Also, for example, when printed on a non-absorptive medium with a typical aqueous pigment ink, the pigment as a coloring material remains on the surface of the glossy paper and forms a coating film. As a result, in comparison with recording with a pigment ink on plain paper or a dye ink that penetrates into the inside of the ink receiving layer, the recorded surface with the aqueous pigment ink has low abrasion resistance so that when the recorded surface is rubbed after printing, the printed coating film peels off and extends to the non-printing portion and contamination ascribable to the abraded material occurs.

Further, for example, in the case of a typical aqueous pigment ink containing a curable material containing water as a major agent, the ink film formed on a substrate is very thin. As a consequence, the polymerizable material is greatly affected by oxygen inhibition, inviting poor reaction so that the ink film is not sufficiently cured. Therefore, the abrasion resistance is not sufficient.

Therefore, the present inventors have found that, for an aqueous curable composition, inclusion of a polysilane compound reduces reaction inhibition due to oxygen and also serves as a polymerization initiator, thereby sufficiently curing an aqueous curable composition. Therefore, it is possible to obtain a curable composition which can obtain cured matter having excellent abrasion resistance while having smoothness and the glossiness of the aqueous film.

Polysilane Compound

Polysilane compound is a generic term for a compound with a silicon (Si)-silicon (Si) bond and has a high refractive index and excellent visible light transmission because the a bond is delocalized on the Si—Si bond main chain.

The polysilane compound is preferably represented by at least any one of the following Chemical formula 1 and Chemical formula 2.

Chemical formula 1

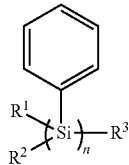

Chemical formula 2

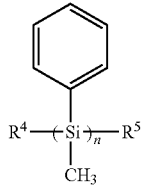

In Chemical formula 1 and Chemical formula 2, $R^1$ to $R^5$ each, independently represent substituents. "n" represents a positive integer.

Examples of the substituent of $R^1$ to $R^5$ include, but are not limited to, a halogen atom such as fluorine, chlorine, or bromine, an alkoxy group having 1 to 12 carbon atoms such as methoxy group, ethoxy group, or isopropoxy group, an aryloxy group such as a phenyloxy group, an oxycarbonyl group such as methoxycarbonyl group, an acyl group such as an acetyl group or a benzoyl group, acyloxy group such as an acetyloxy group, a cyano group, a nitro group, a hydroxyl group, a carboxy group, an oxo group, an epoxy group, an ether group, and an ester group.

n is preferably from 2 to 30.

The polysilane compound has no specific limit and is suitably selected to suit to a particular application as long as the polysilane compound has a phenyl group. Examples include, but are not limited to, polyphenylsilane and poly(methylphenyl)silane.

The polysilane having a phenyl group in the curable composition serves like a polymerization initiator and also has an effect of reducing oxygen inhibition. Therefore, the polymerization reaction of the polymerizable material can be sufficiently conducted, and the abrasion resistance of the resulting cured matter can be enhanced.

The action mechanism of the polysilane compound is inferred to be as follows.

Since the reactivity is low in radical polymerization, as shown in the following Chemical reaction 1, when a peroxy radical (R—O—O—) is produced, the radical reaction is known to be terminated. Even if peroxy radical is produced, the polysilane compound pulls out a hydrogen to regenerate a radical as shown in the following Chemical reaction 2, and conducts a polymerization reaction as shown in the following Chemical reaction 3.

$R_3Si.+O_2 \rightarrow R_3Si—O—O.$          Chemical reaction 1

$R_3SiO_2+R_3Si—H \rightarrow R_3SiO_2+R_3Si.$          Chemical reaction 2

$R'M-O_2+R_3Si—H \rightarrow R'M-O_2H+R_3Si.$          Chemical reaction 3

In Chemical reaction 3, M represents a monomer.

The polysilane compound is available on the market.

Specific examples include, but are not limited to, OGSOL SI-10-20 (molecular weight of 1,800, manufactured by Osaka Gas Chemicals Co., Ltd.), OGSOL S1-20-10 (molecular weight of 1,200, manufactured by Osaka Gas Chemicals Co., Ltd.), OGSOL SI-20-14 (molecular weight of 1,100, manufactured by Osaka Gas Chemicals Co., Ltd.), and OGSOL SI-10-40 (molecular weight of 700, manufactured by Osaka Gas Chemicals Co., Ltd.).

The polysilane compound can be synthesized. There is no specific limit on the synthesis method of the polysilane compound having a phenyl group and it can be suitably selected to suit to a particular application. For example, the polysilane compound can be synthesized by the synthesis methods (a) to (e) of the aryl substituted polysilane compound disclosed in JP-3883453-B (JP-2003-261681).

(a) A method of dehalogenating condensation polymerization of a halosilane having an aryl group in the presence of an alkali metal equivalent to a halogen atom (so-called "Kipping method", J. Am. Chem. Soc., Vol. 110, p 124, published in 1988) and Macromolecules, Vol. 23, p 3423, published in 1990).

(b) A method of dehalogenation condensation polymerization of a halosilane having an aryl group by electrode reduction (J. Chem. Soc., Chem. Commun., p 1161, published in 1990, J. Chem. Soc., Chem. Commun., p 897, published in 1992).

(c) A method of dehydrocondensation polymerization of a hydrosilane having an aryl group in the presence of a metal catalyst (JP-H4-334551-A).

(d) A method of anionic polymerization of disilene cross-linked with biphenyl, etc. (Macromolecules, Vol. 23, p 4494, published in 1990).

(e) After a cyclic silicon compound having a phenyl group or an alkyl group is synthesized by the methods (a) to (d) described above, the synthesized product is derived into a hydro-substituted, halogen-substituted, etc., by a known method (e.g., Z. Anorg. Allg. Chem., Vol. 459, p 123 to p 130, published in 1979). These halogenated cyclic silicon compounds (cyclosilane compounds) can be synthesized by known methods (for example, Mh. Chem. Vol. 106, p 503, published in 1975), Z. Anorg. Allg. Chem. Vol. 621, p 1517, published in 1995. J. Chem. Soc., Chem. Commun., p 777, published in 1984).

The proportion of the polysilane compound in the total content of the composition is preferably from 0.05 to 1.0 percent by mass and more preferably from 0.1 to 0.5 percent by mass. When the proportion of the polysilane compound in the total amount of the composition is 0.05 percent by mass, the polysilane compound served like a polymerization initiator and can reduce oxygen inhibition. In addition, when the proportion of the polysilane compound in the total content of the composition is 1.0 percent by mass or less, dischargeability of the curable composition can be improved.

Polymerizable Material

The polymerizable material contains at least one of polymerizable particles and polymerizable monomers, and may contain other optional materials.

Polymerizable Particle

The polymerizable particle is reactive and can be polymerized with other particles by a stimulus such as ultraviolet rays and heat. Due to inclusion of the polymerizable particle in the curable composition, the cured film obtained by curing the curable composition can have excellent smoothness (glossiness), flexibility, and abrasion resistance.

The polymerizable particle has no specific limit and can be suitably selected to suit to a particular application. For example, polymerizable particles dispersible in water are usable. An example of the polymerizable particle dispersible in water is a reactive polyurethane particle. A specific example of reactive polyurethane particles is a (meth)acrylated polyurethane particle.

The (meth)acrylated polyurethane particle is commercially available.

Specific examples of the commercially available product include, but are not limited to, Ucecoat (registered trademark) 6558 (manufactured by DAICEL-ALLNEX LTD.), Ucecoat (registered trademark) 6559 (manufactured by DAICEL-ALLNEX LTD.), Ebecryl (registered trademark) 2002 (manufactured by DAICEL-ALLNEX LTD.), Ebecryl (registered trademark) 2003 (manufactured by DAICEL-ALLNEX LTD.), Ucecoat (registered trademark) 7710 (manufactured by DAICEL-ALLNEX LTD.), Ucecoat (registered trademark) 7655 (manufactured by DAICEL-ALLNEX LTD.), Neorad R (registered trademark) 440 (manufactured by Avecia), Neorad R (registered trademark) 441 (manufactured by Avecia), Neorad R (registered trademark) 447 (manufactured by Avecia), Neorad R (registered trademark) 448 (manufactured by Avecia), Bayhydrol (registered trademark) UV 2317 (manufactured by Covestro Japan Ltd.), Bayhydrol (registered trademark) UV VP LS2348 (manufacture by Covestro Japan Ltd.), Lux (registered trademark) 430 (manufactured by Alberdingk Boley, Inc.), Lux (registered trademark) 399 (manufactured by, Alberdingk Boley, Inc.), Lux (registered trademark) 484 (manufactured by Alberdingk Boley, Inc.), Laromer (registered trademark) LR 8949 (manufactured by BASF SE), Laromer (registered trademark) LR8983 (manufactured by BASF SE), Laromer (registered trademark) PE22WN (manufactured by BASF SE), and Laromer (registered trademark) PE 55 WN (manufactured by BASF SE), and Laromer (registered trademark) UA9060 (manufactured by BASF SE). Of these, Laromer (registered trademark) LR 8949 (manufactured by BASF SE) and Laromer (registered trademark) LR8983 (manufactured by BASF SE) are preferable. Laromer (registered trademark) LR 8949 (manufactured by BASF SE) and Laromer (registered trademark) LR8983 (manufactured by BASF SE) can enhance abrasion resistance.

The volume average particle diameter of the polymerizable particle is preferably from 20 to 200 nm.

There is no specific limit to the measuring method of the volume average particle diameter and it can be suitably selected to suit to a particular application. For example, a particle size distribution measuring instrument (Nanotrac UPA-EX 150, manufactured by Nikkiso Co., Ltd.) can be used.

The proportion of the polymerizable particle to the total content of the composition is preferably from 2 to 12 percent by mass and more preferably from 7 to 10 percent by mass in solid form. When the proportion of the polymerizable particles is from 2 to 12 percent by mass, abrasion resistance can be enhanced.

Polymerizable Monomer

The polymerizable monomer is not particularly limited as long as it has a reactive substituent capable of conducting a polymerization reaction, and can be suitably selected to suit to a particular application.

As the polymerizable monomer, for example, (meth)acrylate, (meth)acrylamide, and vinyl ether can also be used in combination.

Specific examples include, but are not limited to, ethylene glycol di(meth)acrylate, hydroxypivalate neopentyl glycol di(meth)acrylate, γ-butyrolactone acrylate, isobornyl (meth)acrylate, formalized trimethylolpropane mono(meth)acrylate, polytetramethylene glycol di(meth)acrylate, trimethylolpropane (meth)acrylic acid benzoate, triethylene glycol di(meth)acrylate, tetraethylene glycol di(meth)acrylate, polyethylene glycol diacrylate [$CH_2$=CH—CO—($OC_2H_4$)$_n$—OCOCH=$CH_2$ (n≈4)], polyethylene glycol diacrylate [$CH_2$=CH—CO—($OC_2H_4$)$_n$—OCOCH=$CH_2$ (n≈9)], polyethylene glycol diacrylate [$CH_2$=CH—CO—($OC_2H_4$)$_n$—OCOCH=$CH_2$ (n≈14)], polyethylene glycol diacrylate [$CH_2$=CH—CO—($OC_2H_4$)$_n$—OCOCH=$CH_2$ (n≈23)], dipropylene glycol di(meth)acrylate, tripropylene glycol di(meth)acrylate, polypropylene glycol dimethacrylate [$CH_2$=C($CH_3$)—CO—($OC_3H_6$)$_n$—OCOC($CH_3$)=$CH_2$ (n≈7)], 1,3-butanediol di(meth)acrylate, 1,4-butanediol diacrylate, 1,6-Hexanediol di(meth)acrylate, 1,9-nonanediol di(meth)acrylate, neopentyl glycol diacrylate, tricyclodecane dimethanol diacrylate, propylene oxide modified bisphenol A di(meth)acrylate, polyethylene glycol di(meth)acrylate, dipentaerythritol hexa(meth)acrylate, (meth)acryloyl morpholine, propylene oxide modified tetramethylol methane tetra(meth)acrylate, dipentaerythritol hydroxy penta(meth)acrylate, caprolactone modified dipentaerythritol hydroxy penta(meth)acrylate, ditrimethylolpropane tetra(meth)acrylate, pentaerythritol tetra(meth)acrylate, trimethylolpropane triacrylate, ethylene oxide modified trimethylolpropane tri(meth)acrylate, propylene oxide-modified trimethylolpropane tri(meth)acrylate, caprolactone modified trimethylolpropane tri(meth)acrylate, pentaerythritol tri(meth)acrylate, tris(2-hydroxyethyl)isocyanurate tri (meth)acrylate, neopentyl glycol diacrylate, ethoxylated neopentyl glycol di(meth)acrylate, propylene oxide modified neopentyl glycol di(meth)acrylate, propylene oxide modified glyceryl tri(meth)acrylate, polyester di(meth)acrylate, polyester tri(meth)acrylate, polyester tetra(meth)acrylate, polyester penta(meth)acrylate, polyester poly(meth)acrylate, polyurethane di(meth)acrylate, polyurethane tri(meth)acrylate, polyurethane tetra(meth)acrylate, polyurethane penta(meth)acrylate, polyurethane poly(meth)acrylate, 2-hydroxypropyl(meth)acrylamide, N-vinylcaprolactam, N-vinylpyrrolidone, N-vinyl formamide, cyclohexanedimethanol monovinyl ether, cyclohexane dimethanol divinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, and ethyl oxetane methyl vinyl ether. These can be used alone or in combination. Of these, it may be selected and added in consideration of the solubility in water as the dispersion medium, the viscosity of the composition, the thickness of the cured film (coated film) on the substrate, etc. In terms of solubility in water, acryloyl morpholine, dimethylaminopropyl acrylamide, polyethylene glycol, or polypropylene glycol-modified acrylate is preferable.

The proportion of the polymerizable monomer in the total mass of composition is preferably from 1 to 40 percent by mass and more preferably from 2 to 15 percent by mass. When the proportion of the polymerizable monomer is 1 percent by mass or more, smoothness and glossiness can be increased. When the proportion of the polymerizable monomer is 40 percent by mass or less, smoothness and glosspness can be increased.

Polymerization Initiator

The curable composition of the present disclosure may contain a polymerization initiator. The polymerization initiator produces active species such as a radical or a cation upon an application of energy of active energy rays and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 to 20 percent by mass of the total content (100 percent by mass) of the composition to obtain sufficient curing speed.

Specific examples of the radical polymerization initiators include, but are not limited to, aromatic ketones, acylphosphineoxide compounds, aromatic onium chlorides, organic peroxides, thio compounds (thioxanthone compounds, compounds including thiophenyl groups, etc.), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) can be optionally used together with the polymerization initiator. The polymerization accelerator is not particularly limited. Preferred examples thereof include, but are not limited to, amines such as trimethylamine, methyldimethanolamine, triethanolamine, p-diethylaminoacetophenone, p-dimethylaminoethylbenzoate, p-dimethyl aminobenzoate-2-ethylhexyl, N,N-dimthylbenzylamine and 4,4'-bis(diethylamino) benzophenone. The content of the polymerization accelerator is suitably determined to a particular application depending on the identification of the polymerization initiator and the amount of polymerization initiator used in combination with the polymerization accelerator.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

In the present disclosure, a monohydric alcohol can also be used. An example of the monohydric alcohol is 3-methoxy-1-butanol.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethyl ether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

In addition, as the organic solvent, solubility parameter (SP) value is preferably from 9 to 13 cal/cm$^3$.

A specific example of the organic solvent having an SP value of from 9 to 13 cal/cm$^3$ is 3-methoxy-1-butanol.

The proportion of the organic solvent in the curable composition has no particular limit and can be suitably selected to suit to a particular application.

In terms of drying property and discharging reliability of the curable composition, the proportion is preferably from 10 to 60 percent by mass and more preferably from 20 to 60 percent by mass.

Water

The proportion of water in the curable composition is not particularly limited and can be suitably selected to suit to a particular application. In terms of drying property and discharging reliability of the curable composition, the proportion is preferably from 10 to 90 percent by mass and more preferably from 20 to 60 percent by mass.

Coloring Material

The curable composition of the present disclosure may contain a coloring agent. As the coloring agent, depending on the objectives and requisites of the composition in the present disclosure, various pigments and dyes can be used, which impart black, white, magenta, cyan, yellow, green, orange, and gloss color such as gold and silver. The proportion of the coloring agent is not particularly limited and determined considering the desired color density and dispersibility of the coloring agent in the curable composition, etc. It is preferred that the proportion of the coloring agent account for 0.1 to 20 percent by mass of the total content (100 percent by mass) of the composition. The curable composition of the present disclosure does not necessarily include a coloring material but can be clear and colorless.

If the curable composition contains no coloring material, the composition is suitable as an overcoat layer to protect images.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelate such as basic dye type chelate and acid dye type chelate, dye lakes such as basic dye type lake and acidic dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

The dye includes, for example, an acidic dye, a direct dye, a reactive dye, a basic dye, and a combination thereof.

Pigment Dispersion

Materials such as water and an organic solvent is mixed with a pigment to obtain the curable composition. It is also possible to mix the pigment with water, a dispersant, etc., to prepare a pigment dispersion and thereafter mix the pigment dispersion with material such as water and an organic solvent to manufacture the curable composition.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT 151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin

The type of the resin contained in the curable composition has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particulate made of such resins can be also used. It is possible to mix a resin emulsion in which such resin particulate is dispersed in water as a dispersion medium with materials such as a coloring material and an organic solvent to obtain the curable composition. It is possible to use suitably-synthesized resin particulate as the resin particle. Alternatively, the resin particulate available on the market can be used. These resin particulates can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin in the curable composition is not particularly limited and can be suitably selected to suit to a particular application. In terms of fixability and storage stability of the curable composition, it is preferably from 1 to 30 percent by mass and more preferably from 5 to 20 percent by mass to the total amount of the ink.

The particle diameter of the solid portion in the curable composition has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particulate, pigment particulate, etc. The particle diameter can be measured by using a particle size analyzer (Nanotrac Wave-UT 151, manufactured by MicrotracBEL Corp).

Additive

The curable composition may further optionally include a surfactant, a defoaming agent, a preservative and fungicide, a corrosion inhibitor, a pH regulator, etc.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, preferred are silicone-based surfactants which are not decomposed even in a high pH environment.

Specific examples include, but are not limited to, side-chain-modified polydimethyl siloxane, both-distal-end-modified polydimethylsiloxane, one-distal-end-modified polydimethyl siloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates. These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethyl siloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

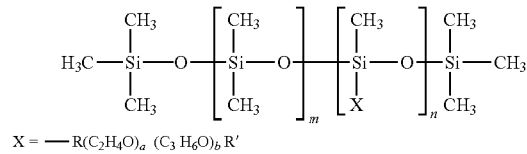

$X = \text{—} R(C_2H_4O)_a\ (C_3H_6O)_b\ R'$

In the Chemical formula S-1 illustrated above, m, n, a, and b each, independently represent integers. R and R' each, independently represent alkyl groups and alkylene groups. Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

$CF_3CF_2(CF_2CF_2)_m\text{—}CH_2CH_2O(CH_2CH_2O)_nH$     Chemical formula F-1

In the compound represented by Chemical formula F-1, "m" is preferably 0 or an integer of from 1 to 10 and "n" is preferably 0 or an integer of from 1 to 40.

$C_nF_{2n+1}\text{—}CH_2CH(OH)CH_2\text{—}O\text{—}(CH_2CH_2O)_a\text{—}Y$     Chemical formula F-2

In the Chemical formula F-2, Y represents H, $C_nF_{2n+1}$, where "n" is an integer of from 1 to 6, $CH_2CH(OH)CH_2\text{—}C_nF_{2n+1}$, where "n" represents an integer of from 4 to 6, or $C_pH_{2p+1}$, where p represents an integer of from 1 to 19. "a" represents an integer of from 4 to 14.

As the fluorochemical surfactant, products available on the market may be used.

Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, and UR (manufactured by E.I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-300 of E.I. du Pont de Nemours and Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the curable composition is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Other Components

The curable composition of the present disclosure may furthermore optionally include other known components. The other known components are not particularly limited. Examples are known articles such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Curing Device

The device to cure the curable composition of the present disclosure utilizes curing upon application of heat or active energy rays. Curing upon application of active energy rays is preferable.

The active energy rays for use in curing the curable composition of the present disclosure are not particularly limited as long as they can apply energy to conduct polymerization reaction of the polymerizable components in the curable composition.

Specific examples include, but are not limited to, electron beams, α rays, β rays, γ rays, and X rays, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source.

Preparation of Curable Composition The curable composition of the present disclosure can be prepared by using the components mentioned above. The preparation devices and conditions are not particularly limited.

For example, the curable composition can be prepared by loading water, a polysilane compound having a phenyl group, a polymerizable material, a pigment, a dispersant, etc., into a dispersing machine such as a ball mill, a kitty mill, a disk mill, a pin mill, and a DYNO-MILL to prepare a pigment liquid dispersion followed by mixing with a polymerizable monomer, an initiator, a polymerization inhibitor, and a surfactant.

Viscosity The viscosity of the curable composition of the present disclosure has no particular limit and it can be adjusted to suit to a particular application and device. For example, if a discharging device that discharges the composition from nozzles is used, the viscosity thereof is preferably in the range of from 3 to 40 mPa·s, more preferably from 5 to 15 mPa·s, and particularly preferably from 6 to 12 mPa·s in the temperature range of from 20 to 65 degrees C., preferably at 25 degrees C. In addition, it is particularly preferable to satisfy this viscosity range without containing the organic solvent mentioned above. Viscosity can be measured by a cone-and-plate type rotary viscometer (VISCOMETER TVE-22L, manufactured by TOK1 SANGYO CO., LTD.) using a cone rotor (1°34'×R24) at a rotational frequency of 50 rpm with a setting of the temperature of hemathermal circulating water in a range of from 20 to 65 degrees C. VISCOMATE VM-150III can be used for the temperature control of the circulating water.

Field of Application

The application field of the curable composition of the present disclosure is not particularly limited. It can be applied to any field where the active energy ray curable composition is used. For example, the curable composition is selected suit to a particular application and used for a resin for processing, a paint, an adhesive, an insulant, a releasing agent, a coating material, a sealing material, various resists, and various optical materials.

Figure 2:
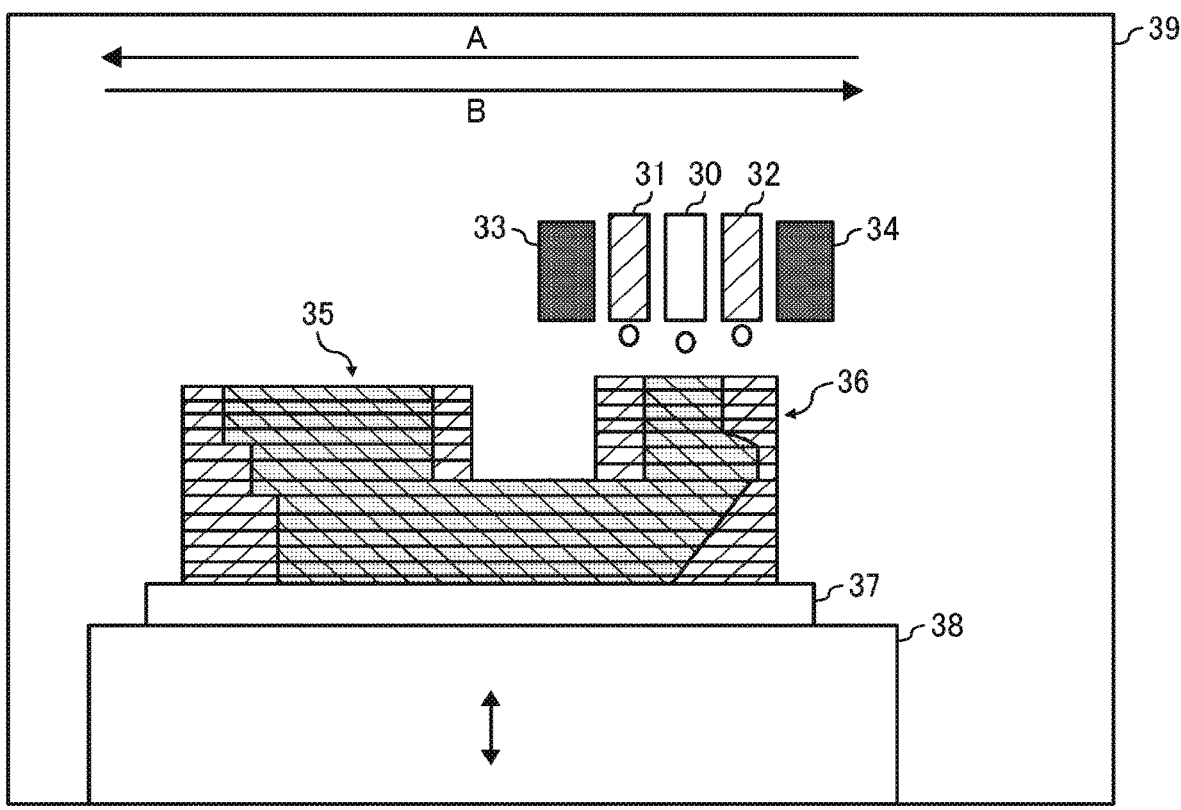
FIG. 2 is a schematic diagram illustrating another example of the image forming device according to an embodiment of the present disclosure.
Figure 3A:
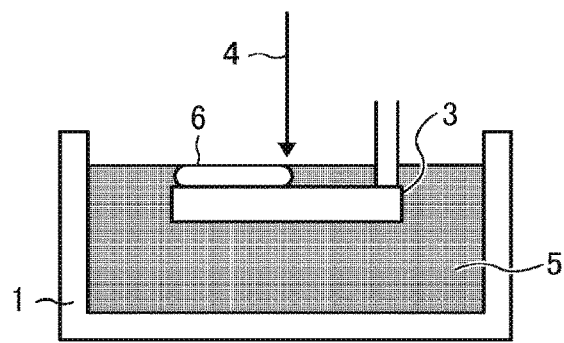
FIGS. 3A, 3B, 3C, and 3D are schematic diagrams illustrating yet another example of the image forming device according to an embodiment of the present disclosure.
Figure 3B:
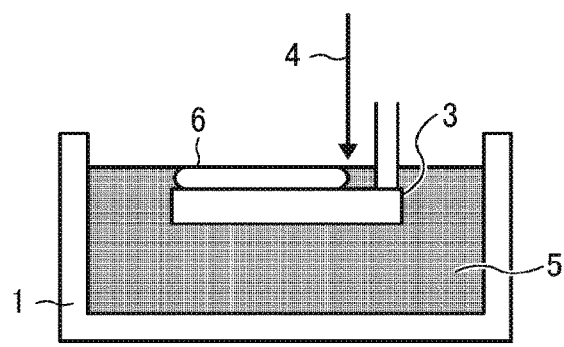
Figure 3C:
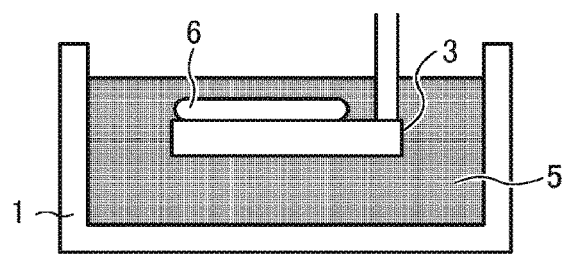
Figure 3D:
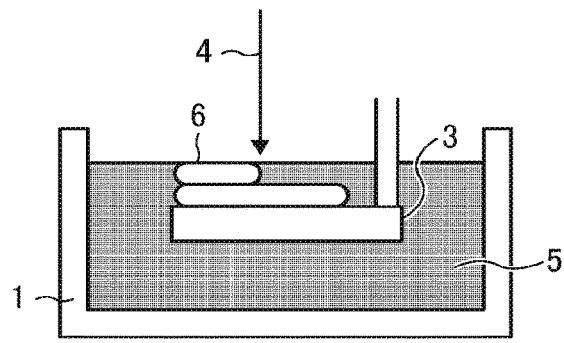

Furthermore, the curable composition of the present disclosure can be used as an ink to form two-dimensional texts, images, and designed coating film on various substrates and in addition a solid object forming material to form a three-dimensional image (solid freeform fabrication object). This solid object forming material can be used as a binder for powder particles for use in powder additive manufacturing to form a solid object by repeating curing and laminating powder layers. Also, it can be used as the solid object constituting material (model material) or supporting member (supporting material) for use in additive manufacturing (rapid prototyping) as illustrated in FIG. 2 and FIG. 3. FIG. 2 is a diagram illustrating a method of discharging the curable composition of the present disclosure to a particular area followed by curing upon irradiation of active energy rays to form a layer and laminating the layers (detail of which is described later).

FIGS. 3A to 3D are diagrams illustrating a method of irradiating a pool (accommodating unit) 1 of the curable composition of the present disclosure with active energy rays 4 to form a cured layer 6 having a particular form on a movable stage 3 and sequentially laminating the cured layer 6 so that a solid freeform fabrication object is obtained.

An apparatus for fabricating a three-dimensional (solid) object by the curable liquid composition of the present disclosure can be a known apparatus and is not particularly limited. For example, the apparatus includes a containing device, a supplying device, and a discharging device of the curable composition, an active energy ray irradiator, etc.

In addition, the present disclosure includes cured matter obtained by causing the curable liquid composition to cure and processed products obtained by processing structures having the cured matter formed on a substrate. For example, the cured product or structures having a sheet-like form or film-like form is subject to molding process such as hot drawing and punching to obtain such a processed product. The molded product is preferably used for, for example, gauges or operation panels of vehicles, office machines, electric and electronic machines, and cameras, which require surface-processing after decorating the surface.

The substrate is not particularly limited. It can be suitably selected to suit to a particular application. Examples are paper, fiber, threads, fabrics, leather, metal, plastic, glass, wood, ceramics, or composite materials thereof. Of these, plastic substrates are preferred in terms of processability.

Recording Medium

The recording medium for use in recording is not particularly limited. Specific examples include, but are not limited to, plain paper, gloss paper, special paper, cloth, film, transparent sheets, and printing paper for general purposes.

Accommodating Unit

The accommodating unit of the present disclosure means a container accommodating the composition and is suitable for the applications as described above. For example, if the curable composition of the present disclosure is used for ink, a container that accommodates the ink can be used as an ink cartridge or an ink bottle. Therefore, users can avoid direct contact with the ink during working such as transfer or replacement of the ink, so that fingers and clothes are prevented from being contaminated. Furthermore, inclusion of foreign matter such as dust in the ink can be prevented. In addition, the container can be of any size, any form, and any material. For example, the container can be designed to a particular application. It is preferable that the container be made of a light blocking material to block the light or covered with a light blocking sheet, etc.

Image Forming Method and Image Forming Device

The image forming method of the present disclosure may utilize active energy rays, heating, etc.

The image forming method of the present disclosure includes at least an irradiating step of irradiating the curable composition of the present disclosure with an active energy ray to cure the curable composition. The image forming device of the present disclosure includes an irradiator to irradiate the curable composition of the present disclosure with an active energy ray and an accommodating unit to accommodate the curable composition of the present disclosure. The accommodating unit may include the container mentioned above.

Furthermore, the method and the device may respectively include a discharging step and a discharging device to discharge the curable composition. The method of discharging the curable composition is not particularly limited. Examples are a continuous spraying method and an on-demand method. The on-demand method includes a piezo method, a thermal method, an electrostatic method, etc.

FIG. 1 is a diagram illustrating a two-dimensional image forming device including an inkjet discharging device. Printing units 32 (23a, 23b, 23c, and 23d) respectively having ink cartridges and discharging heads for yellow, magenta, cyan, and black curable inks discharge the inks onto a recording medium 22 fed from a supplying roll 21. Thereafter, light sources 24a, 24b, 24c, and 24d emit active energy rays to the inks to cure the inks so that a color image is formed. Thereafter, the recording medium 22 is conveyed to a processing unit 25 and a printed matter reeling roll 26. Each of the printing unit 23a, 23b, 23c and 23d may include a heating mechanism to liquidize the ink at the ink discharging portion. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head held at a fixed position while continuously moving the recording medium.

The recording medium 22 is not particularly limited.

Specific examples include, but are not limited to, paper, film, ceramics, glass, metal, or complex materials thereof. The recording medium 22 may take a sheet-like form but is not limited thereto. The image forming device may have a simplex printing configuration capable of printing on one side of a recording medium or a duplex printing configuration capable of printing on both sides thereof.

The recording medium is not limited to articles used as typical recording media. It is suitable to use corrugated cardboard, building materials such as wall paper and floor material, cloth for apparel such as T-shirts, textile, and leather as the recording media.

Optionally, multiple colors can be printed with no or faint active energy rays from the light sources 24a, 24b, and 24c, followed by irradiation of the active energy rays from the light source 24d. This saves energy and cost.

The recorded matter having images printed with the curable composition of the present disclosure includes articles having printed images or texts on a plain surface of conventional paper, resin film, etc., articles having printed images or texts on a rough surface, and articles having printed image or texts on a surface made of various materials such as metal or ceramic.

In addition, by laminating layers of two-dimensional images in part of a recording medium, a partially stereoscopic image (formed of two dimensional part and three-dimensional part) or a three dimensional object can be fabricated.

FIG. 2 is a schematic diagram illustrating an example of the image forming device (device for fabricating a three-dimensional image) relating to the present disclosure. An image forming device 39 illustrated in FIG. 2 forms laminated layers while discharging a first curable composition from a discharging head unit 30 for fabrication object and a second curable composition composed of different ingredients from the first curable composition from discharging head units 31 and 32 for a support by using a head unit having inkjet heads arranged movable in the directions indicated by the arrows A and B and curing each composition by ultraviolet irradiators 33 and 34 placed adjacent to the discharging head units 31 and 32. More specifically, for example, after the discharging head units 31 and 32 for a support discharge the second curable composition onto a substrate 37 for fabrication, the second curable composition is solidified upon application of irradiation of active energy rays to form a first support layer having a hollow space (pool) for fabrication, and the discharging head unit 30 for fabrication object discharges the first curable composition onto the hollow space followed by irradiation of active energy rays for solidification, thereby to form a first fabrication layer. This step is repeated multiple times in accordance with the required number of lamination while moving the stage 38 up and down in the vertical direction to laminate the support layer and the fabrication layer to manufacture a solid freeform fabrication object 35. Thereafter, a laminated support 36 is removed, if desired. Although only a single discharging head unit 30 for fabrication object is disposed in FIG. 2, the device may have two or more discharging head units 30.

Curable Ink

The curable ink of the present disclosure includes a curable composition of the present disclosure.

Cured Matter

The cured matter contains at least one of the curable composition of the present disclosure and the curable ink of the present disclosure and is formed by using at least one of the curable composition of the present disclosure and the curable ink of the present disclosure.

Recorded Matter

The ink recorded matter of the present disclosure includes a recording medium and an image formed on the recording medium with the ink of the present disclosure.

The recorded matter is obtained by an inkjet recording device executing an inkjet recording method.

Printed Matter

The printed matter of the present disclosure has a substrate, and a printing layer containing a cured product of a polymerizable particle and a polysilane compound having a phenyl group on the substrate, and further has other optional members.

The substrate, the polymerizable particle, and the polysilane compound in the present disclosure may be the same as those used in the curable composition of the present disclosure described above, and thus the description thereof is omitted.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1 of Liquid Dispersion of Pigment

After sufficient replacement with nitrogen gas in a 1 L flask equipped with a mechanical stirrer, a thermometer, a nitrogen gas introducing tube, a reflux tube, and a dripping funnel, 11.2 parts of styrene, 2.8 parts of acrylic acid, 12.0 parts of lauryl methacrylate, 4.0 parts of polyethylene glycol methacrylate, 4.0 parts of styrene macromer, and 0.4 parts of mercapto ethanol were mixed in the flask and heated to 65 degrees C.

Next, a liquid mixture of 100.8 parts of styrene, 25.2 parts of acrylic acid, 108.0 parts of lauryl methacrylate, 36.0 parts of polyethylene glycol methacrylate, 60.0 parts of hydroxyethyl methacrylate, 36.0 parts of styrene macromer, 3.6 parts of mercapto ethanol, 2.4 parts of azobisdimethyl valeronitrile, and 18 parts of methylethyl ketone was dripped into the flask in two and a half hours.

Subsequently, a liquid mixture of 0.8 parts of azobismethyl valeronitrile and 18 parts of methylethyl ketone was dripped into the flask in half an hour. Subsequent to one-hour aging at 65 degrees C., 0.8 parts of azobisdimethyl valeronitrile was added followed by another one-hour aging. After the reaction was complete, 364 parts of methylethyl ketone was added to the flask to obtain 800 parts of polymer solution A having a concentration of 50 percent by mass.

Thereafter, 28 parts of the thus-obtained polymer solution A, 42 parts of carbon black (FW 100, manufactured by Degussa AG), 13.6 parts of 1 mol/L aqueous solution of potassium hydroxide, 20 parts of methyl ethyl ketone, and 13.6 parts of deionized water were sufficiently stirred and kneaded using a roll mill to obtain a paste. The thus-obtained paste was loaded in 200 parts of deionized water followed by sufficient stirring. Methyl ethyl ketone and water were distilled away using an evaporator and coarse particles were removed by filtrating the thus-obtained liquid dispersion with a polyvinylidene fluoride membrane filter having an average pore diameter of 5.0 μm under a pressure to obtain a pigment containing polymer particulate liquid dispersion (Bk) containing a pigment in an amount of 15 percent by mass with a solid portion of 20 percent by mass. The average particle diameter ($D_{50}$) of the polymer particulates in the liquid dispersion of pigment was measured. The volume average particle diameter ($D_{50}$) measured by a particle size distribution measuring instrument (NANOTRAC UPA-EX150, manufactured by NIKKISO CO., LTD.) was 110.0 nm.

Preparation Example 2 of Liquid Dispersion of Pigment 1.0 part of carboxylic acid ester-containing acrylic block copolymer (dispersant, DISPERBYK-168, acid value of 0 mg KOH/g, amine value of 11 mgKOH/g, manufactured by Byc Chemie Japan Co., Ltd.), 40.0 parts of monofunctional monomer PEA (phenoxyethyl acrylate, manufactured by OSAKA ORGANIC CHEMICAL INDUSTRY LTD.), and 10.0 parts of carbon black (MA14, manufactured by Mitsubishi Chemical Corporation) were added and mixed by stirring with a stirrer for one hour. Thereafter, the mixture was stirred for two hours by a bead mill to obtain a carbon black (Bk) pigment liquid dispersion (Bk/PEA liquid dispersion).

Example 1

Preparation of INKJET Ink 1

A water-soluble organic solvent (humectant) shown in Table 1 and water were uniformly mixed by stirring for one hour. The polymerizable material was added and stirred for one hour, and the pigment liquid dispersion, a polymerization initiator, a defoaming agent, and a pH regulator were added and stirred for one hour. The thus-obtained liquid dispersion was filtered with a polyvinilydene fluoride membrane filter having an average pore diameter of 5.0 μm under a pressure to remove coarse particles and dust to prepare inkjet ink 1.

Examples 2 to 24 and Comparative Examples 1 to 5

Preparation of Inkjet Inks 2 to 29

Inkjet inks 2 to 29 were prepared in the same manner as in Example 1 except that the composition of Example 1 was changed to the compositions shown in Tables 1 to 6.

Next, abrasion resistance, glossiness, storage property, and discharging stability were measured and evaluated in the following manner for the obtained inkjet inks 1 to 29. The results are shown in Tables 7 to 11.

Abrasion Resistance

In the environment condition of 23±0.5 degrees C. and 50±5 percent RH, using an inkjet recording device (IPSiO GXe-5500, manufactured by Ricoh Co., Ltd.), the drive voltage of the piezo element was varied in such a manner that the same amount of the ink adhered to a commercially available PET film (film thickness of 100 km).

Next, the printing mode of the inkjet recording device was set to "plain paper clean", and a 5 cm×20 cm solid image chart was printed. After printing the solid image chart, heated air was blown thereto on a hot plate heated to 120 degrees C. at a distance of 20 cm for 30 seconds using a heat gun (PJ-206A1) for drying. Thereafter, using a metal halide lamp, the solid image was irradiated with light in the wavelength range corresponding to the UV-A range (wavelength of from 350 to 400 nm) with an integrated light quantity of 500 mJ/cm$^2$ to cure the inkjet ink, thereby forming a film (cured matter) having an average thickness of 2 μm.

The ink of Comparative Example 5, which was a non-aqueous ink, was not printable by the inkjet device mentioned above. Therefore, a printing device of a flat bed type carrying a head (MH5220, manufactured by Ricoh Co., Ltd.) was manufactured and a solid image chart of 5 cm×20 cm was printed under the condition of 600 dpi, 2 pass, and an attachment amount of 1.0 g/m$^2$. The thus-obtained film was subjected to the same treatment after the printing.

Thereafter, the thus-prepared cured matter and a white cloth cotton (Kanakin No. 3) for test according to JIS L 0803 format were mounted onto a rubbing fastness tester RT-300 (device according to rubbing tester II type (Gakushin type, manufactured by DAIEI KAGAKU SEIKI MFG. co., ltd.) specified in Testing Method for Color Fastness to Rubbing (JIS L-0849 format). A weight of 500 g was mounted and reciprocally rubbed the cured matter 100 times. The carbon black density of the cotton after the test was measured by eXact Scan (manufactured by X-Rite Inc.), and the difference in density between the cotton and an original cotton not subjected to the test was evaluated. The measuring result of abrasion resistance was evaluated according to the following evaluation criteria.

Evaluation Criteria
A: Density difference was 0.02 or less
B: Density difference was more than 0.02 to 0.01
C: Density difference was more than 0.01 to 0.5
D: Density difference was more than 0.5

Glossiness (Smoothness)

Under the same conditions as the abrasion resistance, film (cured matter) was formed. Glossiness was measured to evaluate smoothness of the resulting coated film as follows.

Thereafter, glossiness at 60 degrees of the solid image portion was measured after drying by a gloss meter (4501, manufactured by BYK Gardener) and evaluated according to the following criteria.

Evaluation Criteria
A: Glossiness at 60 degrees was 80 percent or more
B: Glossiness at 60 degrees was from 50 to less than 80 percent
C: Glossiness at 60 degrees was from 20 to less than 50 percent
D: Glossiness at 60 degrees was less than 20 percent Storage Stability Viscosity of the thus-prepared Inkjet inks 1 to 29 was measured after preparation and the thus-prepared Inkjet inks 1 to 29 were sealed in a polyethylene container. After storing the Inkjet inks at 60 degrees C. for two weeks, viscosity was measured again. The viscosity after storage was divided by the viscosity before storage to calculate the change ratio and storage stability was evaluated according to the following evaluation criteria. Viscosity was measured by a viscometer (RL-500, manufactured by TOKI SANGYO CO., LTD.) at 25 degrees C.

Evaluation Criteria
A: Change ratio was less than 10 percent
B: Change ratio was 10 percent or more Discharging Stability An inkjet discharging device carrying a head (GEN 4, manufactured by Ricoh Co., Ltd.) continuously discharged each of Inkjet inks 1 to 29 for 60 minutes and the number of non-discharging nozzles was counted to evaluate discharging stability based on the following evaluation criteria. The inkjet discharging device was set to have a driving frequency of 18 kHz, a heating temperature of 35 degrees C., and an ink discharging amount of 2 pL per ink discharging.

Evaluation Criteria
A: The number of non-discharging nozzles was 2 or less
B: The number of non-discharging nozzles was 3 or more

TABLE 1

| Composition | | | Example 1 | Example 2 | Example 3 | Example 4 | Example 5 |
|---|---|---|---|---|---|---|---|
| | | | Ink No. | | | | |
| | Compound | Product | 1 | 2 | 3 | 4 | 5 |
| Polysilane compound | Poly (methylphenyl) silane | OGSOL SI-10-20 | 0.05 | 0.05 | 0.05 | 0.05 | 0.05 |
| | Polyphenyl silane | OGSOL SI-20-10 | — | — | — | — | — |
| | Polydimethyl silane (comparative compound) | POLY (DIMETHYL SILANE) | — | — | — | — | — |
| Polymerizable particle | — | Laromer LR 8949 | — | — | — | — | — |

TABLE 1-continued

|  |  |  | Example | | | | |
|---|---|---|---|---|---|---|---|
|  |  |  | 1 | 2 | 3 | 4 | 5 |
| Composition | | | Ink No. | | | | |
|  | Compound | Product | 1 | 2 | 3 | 4 | 5 |
| [urethane dispersion] (solid content) | — | Laromer LR 8983 | — | — | — | — | — |
| Urethane emulsion (comparative material) | — | UX3945 | — | — | — | — | — |
| Polymerizable monomer | Acryloyl morpholine | — | 6.0 | — | — | — | 5.0 |
|  | Dimethyl aminopropyl acrylamide | — | — | — | — | — | — |
|  | Hydroxyethyl acrylate | — | — | 1.0 | 2.0 | 2.0 | 9.0 |
|  | Mixture of pentaerythritol triacrylate and pentaerythritol tetraacrylate | KAYARAD PET-30 | — | — | — | 1.0 | 1.0 |
|  | Isobonyl acrylate | — | — | — | — | — | — |
|  | Phenoxyethyl acrylate | — | — | — | — | — | — |
| Polymerization initiator | Bis(2,4,6-trimethyl benzoyl) phenylphosphine oxide | IRGACURE 2959 | 1.0 | 1.0 | 1.0 | 1.0 | 1.0 |
|  | 2,4,6-trimethyl benzoyl-diphenyl-phosphine oxide | IRGACURE 1173 | — | — | — | — | — |
| Organic solvent | 2-pyrrolidone (SP value: 12.6) | — | — | — | — | — | — |
|  | 3-methoxy-N,N-dimethyl propionamide (SP value: 9.1) | — | — | — | — | — | — |
|  | 3-methoxybutanol (SP value: 10.0) | — | — | — | — | — | — |
|  | 1,2-propylene glycol (SP value: 13.5) | — | 15.0 | 10.0 | 10.0 | 10.0 | — |
|  | Glycerin (SP value: 16.5) | — | — | 5.0 | 5.0 | 7.0 | — |
| Pigment (solid part by mass) | Pigment liquid dispersion | Bk/liquid dispersion | 6.0 | 4.0 | 4.0 | 6.0 | 6.0 |
|  |  | Bk/PEA liquid dispersion | — | — | — | — | — |
|  | Water | | Balance | Balance | Balance | Balance | Balance |
|  | Total | | 100 | 100 | 100 | 100 | 100 |
|  | Amount of polymerization initiator | | 1.0 | 1.0 | 1.0 | 1.0 | 1.0 |
|  | Amount of polysilane compound | | 0.05 | 0.05 | 0.05 | 0.05 | 0.05 |

TABLE 2

|  |  |  | Example | | | | |
|---|---|---|---|---|---|---|---|
|  |  |  | 6 | 7 | 8 | 9 | 10 |
| Composition | | | Ink No. | | | | |
|  | Compound | Product | 6 | 7 | 8 | 9 | 10 |
| Polysilane compound | Poly(methylphenyl) silane | OGSOL SI-10-20 | — | — | — | 0.05 | 0.05 |
|  | Polyphenyl silane | OGSOL SI-20-10 | 0.05 | 0.05 | 0.05 | — | — |

TABLE 2-continued

| Composition | | | Example | | | | |
|---|---|---|---|---|---|---|---|
| | | | 6 | 7 | 8 | 9 | 10 |
| | | | | | Ink No. | | |
| | Compound | Product | 6 | 7 | 8 | 9 | 10 |
| | Polydimethyl silane (comparative compound) | POLY (DIMETHYL SILANE) | — | — | — | — | — |
| Polymerizable particle [urethane dispersion] (solid content) | — | Laromer LR 8949 | — | — | — | — | — |
| | — | Laromer LR 8983 | — | — | — | — | — |
| Urethane emulsion (comparative material) | — | UX3945 | — | — | — | — | — |
| Polymerizable monomer | Acryloyl morpholine | — | 5.0 | 20.0 | 20.0 | — | 5.0 |
| | Dimethyl aminopropyl acrylamide | — | — | — | — | — | — |
| | Hydroxyethyl acrylate | — | 11.0 | 20.0 | 22.0 | 2.0 | 9.0 |
| | Mixture of pentaerythritol triacrylate and pentaerythritol tetraacrylate | KAYARAD PET-30 | 1.0 | — | — | 1.0 | 1.0 |
| | Isobonyl acrylate | — | — | — | — | — | — |
| | Phenoxyethyl acrylate | — | — | — | — | — | — |
| Polymerization initiator | Bis(2,4,6-trimethyl benzoyl) phenylphosphine oxide | IRGACURE 2959 | — | — | — | 1.0 | 1.0 |
| | 2,4,6-trimethyl benzoyl-diphenyl-phosphine oxide | IRGACURE 1173 | 1.0 | 1.0 | 1.0 | — | — |
| Organic solvent | 2-pyrrolidone (SP value: 12.6) | — | — | — | — | — | — |
| | 3-methoxy-N,N-dimethyl propionamide (SP value: 9.1) | — | — | — | — | — | — |
| | 3-methoxybutanol (SP value: 10.0) | — | — | — | — | — | — |
| | 1,2-propylene glycol (SP value: 13.5) | — | — | — | — | 10.0 | — |
| | Glycerin (SP value: 16.5) | — | — | — | — | 7.0 | — |
| Pigment (solid part by mass) | Pigment liquid dispersion | Bk/liquid dispersion | 6.0 | 2.0 | 2.0 | 6.0 | 6.0 |
| | | Bk/PEA liquid dispersion | — | — | — | — | — |
| | Water | | Balance | Balance | Balance | Balance | Balance |
| | Total | | 100 | 100 | 100 | 100 | 100 |
| | Amount of polymerization initiator | | 1.0 | 1.0 | 1.0 | 1.0 | 1.0 |
| | Amount of polysilane compound | | 0.05 | 0.05 | 0.05 | 0.05 | 0.05 |

TABLE 3

| Composition | | | Example | | | | |
|---|---|---|---|---|---|---|---|
| | | | 11 | 12 | 13 | 14 | 15 |
| | | | | | Ink No. | | |
| | Compound | Product | 11 | 12 | 13 | 14 | 15 |
| Polysilane compound | Poly (methylphenyl) silane | OGSOL SI-10-20 | 0.50 | 1.00 | — | 0.05 | 0.05 |
| | Polyphenyl silane | OGSOL SI-20-10 | — | — | 0.30 | — | — |
| | Polydimethyl silane (comparative compound) | POLY (DIMETHYL SILANE) | — | — | — | — | — |
| Polymerizable particle [urethane dispersion] (solid content) | — | Laromer LR 8949 | 6.0 | 6.0 | 6.0 | — | — |
| | — | Laromer LR 8983 | — | — | — | — | — |
| Urethane emulsion (comparative material) | — | UX3945 | — | — | — | — | — |
| Polymerizable monomer | Acryloyl morpholine | — | — | — | — | — | 5.0 |
| | Dimethyl aminopropyl acrylamide | — | — | — | — | — | — |
| | Hydroxyethyl acrylate | — | — | — | — | 2.0 | 9.0 |
| | Mixture of pentaerythritol triacrylate and pentaerythritol tetraacrylate | KAYARAD PET-30 | — | — | — | 1.0 | 1.0 |
| | Isobonyl acrylate | — | — | — | — | — | — |
| | Phenoxyethyl acrylate | — | — | — | — | — | — |
| Polymerization initiator | Bis(2,4,6-trimethyl benzoyl) phenylphosphine oxide | IRGACURE 2959 | — | — | 1.0 | 1.0 | 1.0 |
| | 2,4,6-trimethyl benzoyl-diphenyl-phosphine oxide | IRGACURE 1173 | 1.0 | 1.0 | — | — | — |
| Organic solvent | 2-pyrrolidone (SP value: 12.6) | — | — | — | — | — | — |
| | 3-methoxy-N,N-dimethyl propionamide (SP value: 9.1) | — | — | — | — | — | — |
| | 3-methoxybutanol (SP value: 10.0) | — | — | — | — | — | — |
| | 1,2-propylene glycol (SP value: 13.5) | — | 15.0 | 15.0 | 15.0 | 10.0 | — |
| | Glycerin (SP value: 16.5) | — | — | — | — | 7.0 | — |
| Pigment (solid part by mass) | Pigment liquid dispersion | Bk/liquid dispersion | 6.0 | 6.0 | 6.0 | 6.0 | 6.0 |
| | | Bk/PEA liquid dispersion | — | — | — | — | — |
| Water | | | Balance | Balance | Balance | Balance | Balance |
| Total | | | 100 | 100 | 100 | 100 | 100 |
| Amount of polymerization initiator | | | 1.0 | 1.0 | 1.0 | 1.0 | 1.0 |
| Amount of polysilane compound | | | 0.50 | 1.00 | 0.30 | 0.05 | 0.05 |

TABLE 4

| Composition | | | Example | | | | |
|---|---|---|---|---|---|---|---|
| | | | 16 | 17 | 18 | 19 | 20 |
| | | | | | Ink No. | | |
| | Compound | Product | 16 | 17 | 18 | 19 | 20 |
| Polysilane compound | Poly (methylphenyl) silane | OGSOL SI-10-20 | 0.30 | — | — | 0.05 | 0.05 |
| | Polyphenyl silane | OGSOL SI-20-10 | — | 0.30 | 0.30 | — | — |
| | Polydimethyl silane (comparative compound) | POLY (DIMETHYL SILANE) | — | — | — | — | — |
| Polymerizable particle [urethane dispersion] (solid content) | — | Laromer LR 8949 | 7.0 | 8.0 | 10.0 | — | — |
| | — | Laromer LR 8983 | — | — | — | — | — |
| Urethane emulsion (comparative material) | — | UX3945 | — | — | — | — | — |
| Polymerizable monomer | Acryloyl morpholine | — | — | — | — | — | 5.0 |
| | Dimethyl aminopropyl acrylamide | — | — | — | — | — | — |
| | Hydroxyethyl acrylate | — | — | — | — | 2.0 | 9.0 |
| | Mixture of pentaerythritol triacrylate and pentaerythritol tetraacrylate | KAYARAD PET-30 | — | — | — | 1.0 | 1.0 |
| | Isobonyl acrylate | — | — | — | — | — | — |
| | Phenoxyethyl acrylate | — | — | — | — | — | — |
| Polymerization initiator | Bis(2,4,6-trimethyl benzoyl) phenylphosphine oxide | IRGACURE 2959 | 1.0 | 1.0 | 1.0 | 1.0 | 1.0 |
| | 2,4,6-trimethyl benzoyl-diphenyl-phosphine oxide | IRGACURE 1173 | — | — | — | — | — |
| Organic solvent | 2-pyrrolidone (SP value: 12.6) | — | — | 5.0 | — | — | — |
| | 3-methoxy-N,N-dimethyl propionamide (SP value: 9.1) | — | — | — | — | — | — |
| | 3-methoxybutanol (SP value: 10.0) | — | — | 10.0 | — | — | — |
| | 1,2-propylene glycol (SP value: 13.5) | — | 15.0 | — | 15.0 | 10.0 | — |
| | Glycerin (SP value: 16.5) | — | — | — | — | 7.0 | — |
| Pigment (solid part by mass) | Pigment liquid dispersion | Bk/liquid dispersion | 6.0 | 6.0 | 6.0 | 6.0 | 6.0 |
| | | Bk/PEA liquid dispersion | — | — | — | — | — |
| Water | | | Balance | Balance | Balance | Balance | Balance |
| Total | | | 100 | 100 | 100 | 100 | 100 |
| Amount of polymerization initiator | | | 1.0 | 1.0 | 1.0 | 1.0 | 1.0 |
| Amount of polysilane compound | | | 0.30 | 0.30 | 0.30 | 0.05 | 0.05 |

TABLE 5

| Composition | | | Example 21 Ink No. 21 | Example 22 Ink No. 22 | Example 23 Ink No. 23 | Example 24 Ink No. 24 |
|---|---|---|---|---|---|---|
| | Compound | Product | | | | |
| Polysilane compound | Poly(methylphenyl)silane | OGSOL SI-10-20 | — | 0.30 | 0.30 | 0.05 |
| | Polyphenyl silane | OGSOL SI-20-10 | 0.30 | — | — | — |
| | Polydimethyl silane (comparative compound) | POLY(DIMETHYLSILANE) | — | — | — | — |
| Polymerizable particle [urethane dispersion] (solid content) | — | Laromer LR 8949 | 12.0 | — | 8.0 | 3.0 |
| | — | Laromer LR 8983 | — | 8.0 | — | — |
| Urethane emulsion (comparative material) | — | UX3945 | — | — | — | — |
| Polymerizable monomer | Acryloyl morpholine | — | — | — | — | 3.0 |
| | Dimethyl aminopropyl acrylamide | — | — | — | — | — |
| | Hydroxyethyl acrylate | — | — | — | — | — |
| | Mixture of pentaerythritol triacrylate and pentaerythritol tetraacrylate | KAYARAD PET-30 | — | — | — | — |
| | Isobonyl acrylate | — | — | — | — | — |
| | Phenoxyethyl acrylate | — | — | — | — | — |
| Polymerization initiator | Bis(2,4,6-trimethyl benzoyl)phenylphosphine oxide | IRGACURE 2959 | 1.0 | 1.0 | — | 1.0 |
| | 2,4,6-trimethyl benzoyl-diphenyl-phosphine oxide | IRGACURE 1173 | — | — | 1.0 | — |
| Organic solvent | 2-pyrrolidone (SP value: 12.6) | | — | — | 10.0 | — |
| | 3-methoxy-N,N-dimethyl propionamide (SP value: 9.1) | | — | 15.0 | — | — |
| | 3-methoxybutanol (SP value: 10.0) | | — | — | — | — |
| | 1,2-propylene glycol (SP value: 13.5) | | — | 15.0 | 5.0 | 13.0 |
| | Glycerin (SP value: 16.5) | | — | — | — | — |
| Pigment (solid part by mass) | Pigment liquid dispersion | Bk/liquid dispersion | 6.0 | 6.0 | 6.0 | 6.0 |
| | | Bk/PEA liquid dispersion | — | — | — | — |
| Water | | | Balance | Balance | Balance | Balance |
| Total | | | 100 | 100 | 100 | 100 |
| Amount of polymerization initiator | | | 1.0 | 1.0 | 1.0 | 1.0 |
| Amount of polysilane compound | | | 0.30 | 0.30 | 0.30 | 0.05 |

TABLE 6

| Composition | | | Comparative Example | | | | |
|---|---|---|---|---|---|---|---|
| | | | 1 | 2 | 3 | 4 | 5 |
| | | | Ink No. | | | | |
| | Compound | Product | 25 | 26 | 27 | 28 | 29 |
| Polysilane compound | Poly (methylphenyl) silane | OGSOL SI-10-20 | 0.30 | — | — | — | — |
| | Polyphenyl silane | OGSOL SI-20-10 | — | — | — | — | — |
| | Polydimethyl silane (comparative compound) | POLY (DIMETHYL SILANE) | — | — | — | 0.05 | — |
| Polymerizable particle [urethane dispersion] (solid content) | — | Laromer LR 8949 | — | 8.0 | — | 3.0 | — |
| | — | Laromer LR 8983 | — | — | — | — | — |
| Urethane emulsion (comparative material) | — | UX3945 | 8.0 | — | 8.0 | — | — |
| Polymerizable monomer | Acryloyl morpholine | — | — | — | — | 3.0 | 30.0 |
| | Dimethyl aminopropyl acrylamide | — | — | — | — | — | — |
| | Hydroxyethyl acrylate | — | — | — | — | — | — |
| | Mixture of pentaerythritol triacrylate and pentaerythritol tetraacrylate | KAYARAD PET-30 | — | — | — | — | — |
| | Isobonyl acrylate | — | — | — | — | — | 20.0 |
| | Phenoxyethyl acrylate | — | — | — | — | — | 34.0 |
| Polymerization initiator | Bis(2,4,6-trimethyl benzoyl) phenylphosphine oxide | IRGACURE 2959 | 1.0 | — | — | 1.0 | — |
| | 2,4,6-trimethyl benzoyl-diphenyl-phosphine oxide | IRGACURE 1173 | — | 1.0 | 1.0 | — | 10.0 |
| Organic solvent | 2-pyrrolidone (SP value: 12.6) | — | — | 10.0 | 10.0 | — | — |
| | 3-methoxy-N,N-dimethyl propionamide (SP value: 9.1) | — | 15.0 | — | — | — | — |
| | 3-methoxybutanol (SP value: 10.0) | — | — | — | — | — | — |
| | 1,2-propylene glycol (SP value: 13.5) | — | — | 5.0 | 5.0 | 13.0 | — |
| | Glycerin (SP value: 16.5) | — | — | — | — | — | — |
| Pigment (solid part by mass) | Pigment liquid dispersion | Bk/liquid dispersion | 6.0 | 6.0 | 6.0 | 6.0 | — |
| | | Bk/PEA liquid dispersion | — | — | — | — | 6.0 |
| | Water | | Balance | Balance | | | — |
| | Total | | 100 | 100 | 100 | | |
| | Amount of polymerization initiator | | 1.0 | 1.0 | 10.0 | | |
| | Amount of polysilane compound | | — | — | — | | |

The details of each component shown in Tables 1 to 6 are as follows.

OGSOL SI-10-20: Polysilane having a phenyl group (molecular weight of 1,800, manufactured by Osaka Gas Chemical Co., Ltd.)

OGSOL SI-20-10: Polysilane having a phenyl group (molecular weight of 1,200, manufactured by Osaka Gas Chemical Co., Ltd.)

POLY(DIMETHYLSILANE): Polysilane having no phenyl group (molecular weight of from 1000 to 3000, manufactured by Gelest, Inc.)

Laromer LR 8949: reactive urethane dispersion (manufactured by BASF SE)

Laromer LR 8983: reactive urethane dispersion (manufactured by BASF SE)

UX 3945: urethane emulsion (manufactured by Sanyo Chemical Industries, Ltd.)

Acryloyl morpholine (manufactured by KJ Chemicals Corporation)

Dimethylaminopropyl acrylamide (manufactured by KJ Chemicals Corporation)

Hydroxyethyl acrylate (manufactured by KJ Chemicals Corporation)

KAYARAD PET-30 (manufactured by Nippon Kayaku Co., Ltd.)

Isobonyl acrylate (manufactured by OSAKA ORGANIC CHEMICAL INDUSTRY LTD.)

Phenoxyethyl acrylate (manufactured by OSAKA ORGANIC CHEMICAL INDUSTRY LTD.)

IRGACURE 2959: polymerization initiator (manufactured by BASF SE)

IRGACURE 8983: polymerization initiator (manufactured by BASF SE)

TABLE 7

|  |  | Example | | | | | | |
| --- | --- | --- | --- | --- | --- | --- | --- | --- |
|  |  | 1 | 2 | 3 | 4 | 5 | 6 | 7 |
| Evaluation result | Abrasion resistance | C | C | C | C | C | C | C |
|  | Glossiness | A | B | A | A | A | A | A |
|  | Storage property | B | B | B | B | A | B | B |
|  | Dischargeability | B | B | B | B | B | B | B |

TABLE 8

|  |  | Example | | | | | | |
| --- | --- | --- | --- | --- | --- | --- | --- | --- |
|  |  | 8 | 9 | 10 | 11 | 12 | 13 | 14 |
| Evaluation result | Abrasion resistance | C | C | C | B | B | B |
|  | Glossiness | B | B | C | B | A | A |
|  | Storage property | B | B | B | B | B | B |
|  | Dischargeability | B | B | B | A | A | A |

TABLE 9

|  |  | Example | | | | | | |
| --- | --- | --- | --- | --- | --- | --- | --- | --- |
|  |  | 15 | 16 | 17 | 18 | 19 | 20 | 21 |
| Evaluation result | Abrasion resistance | B | B | B | A | A | A | B |
|  | Glossiness | A | A | A | A | A | A | A |
|  | Storage property | B | B | B | B | A | B | B |
|  | Dischargeability | A | B | B | A | A | A | A |

TABLE 10

|  |  | Example | | |
| --- | --- | --- | --- | --- |
|  |  | 22 | 23 | 24 |
| Evaluation result | Abrasion resistance | A | A | B |
|  | Glossiness | A | A | A |
|  | Storage property | A | A | B |
|  | Dischargeability | A | A | B |

TABLE 11

|  |  | Comparative Example | | | | |
| --- | --- | --- | --- | --- | --- | --- |
|  |  | 1 | 2 | 3 | 4 | 5 |
| Evaluation result | Abrasion resistance | D | D | D | D | D |
|  | Glossiness | A | A | A | A | D |
|  | Storage property | A | A | A | B | B |
|  | Dischargeability | A | A | A | B | B |

Aspects of the present disclosure are, for example, as follows.

1. A curable composition contains water, a polysilane compound having a phenyl group, and at least one of a polymerizable particle and a polymerizable monomer.

2. The curable composition according to 1 mentioned above, wherein the polymerizable particle contains a reactive polyurethane particle.

3. The curable composition according to 1 or 2 mentioned above, wherein the proportion of the polysilane compound in the curable composition is from 7 to 10 percent by mass.

4. The curable composition according to any one of 1 to 3 mentioned above, wherein the proportion of the polysilane compound is from 0.1 to 0.5 percent by mass.

5. The curable composition according to any one of 1 to 4 mentioned above, further contains an organic solvent having an SP Value of from 9 to 13 cal/cm$^3$.

6. The curable composition according to 5 mentioned above, wherein the organic solvent contains at least one member selected from the group consisting of 3-methoxy-N,N-dimethyl propionamide, 2-pyrrolidone, and methoxy butanol.

7. The curable composition according to any one of 1 to 6 mentioned above, wherein the curable composition is an active energy ray curable composition.

8. A curable ink includes the curable composition of any one of 1 to 7 mentioned above.

9. An accommodating unit contains at least one of the curable composition of any one of 1 to 7 mentioned above and the curable of 8 mentioned above.

10. A two-dimensional or three-dimensional image forming device contains an accommodating unit accommodating the curable composition of any one of 1 to 7 mentioned above and the curable ink of 8 mentioned above, and an irradiator configured to emit active energy rays.

11. The two-dimensional or three-dimensional image forming device according to 10 mentioned above, further contains a discharging device configured to jet the curable composition or the curable ink in an inkjet method.

12. A two-dimensional or three-dimensional image forming method includes irradiating at least one of the curable composition of any one of 1 to 7 mentioned above and a curable ink of 8 mentioned above with active energy rays.

13. Cured matter formed using at least one of the curable composition of any one of 1 to 7 mentioned above and/or the curable ink of 8 mentioned above.

14. Printed matter includes a substrate and a printing layer on the substrate, the printing layer containing cured matter formed of a polymerizable particle and a polysilane compound having a phenyl group.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A curable composition, comprising:
   water;
   a polysilane compound comprising a silane repeating unit having a single phenyl group and hydrogen or an alkyl group; and
   polymerizable particle and/or a polymerizable monomer,
   wherein the polysilane is present in the composition in a range of from 0.1 to 0.3 wt. %, and
   wherein, if present, the polymerizable particle is present in composition in a range of from 2 to 12 wt. %.

2. The composition of claim 1, wherein the polymerizable particle comprises a reactive polyurethane particle.

3. The composition of claim 1, wherein a proportion of the polymerizable particle is from 7 to 10 percent by mass.

4. The composition of claim 1, further comprising:
   an organic solvent having a solubility parameter value in a range of from 9 to 13 cal/cm$^3$.

5. The composition of claim 4, wherein the organic solvent comprises 3-methoxy-N,N-dimethyl propionamide, 2-pyrrolidone, and/or methoxy butanol.

6. The composition of claim 1, which is an active energy ray curable composition.

7. A curable ink, comprising:
   the curable composition of claim 1.

8. An accommodating unit, comprising:
   a container; and
   curable composition of claim 1 and/or a curable ink comprising the curable composition.

9. A two-dimensional or three-dimensional image forming method, the method comprising:
   irradiating the curable composition of claim 1 and/or a curable ink comprising the curable composition with active energy rays.

10. A cured matter, comprising:
    the curable composition of claim 1.

11. A printed matter, comprising:
    a substrate; and
    a printing layer on the substrate, comprising cured matter formed of the composition of claim 1, comprising the polymerizable particle.

12. The composition of claim 1, wherein the silane repeating unit has the single phenyl group and the alkyl group.

13. The composition of claim 1, wherein the silane repeating unit has the single phenyl group and the hydrogen.

14. The composition of claim 1, wherein the polysilane compound comprises poly(methylphenyl) silane and/or polyphenyl silane.

15. The composition of claim 1, wherein the polysilane compound comprises poly(methylphenyl) silane.

16. The composition of claim 1, wherein the polysilane compound comprises polyphenyl silane.

17. The printed matter of claim 11, wherein the polysilane compound comprises poly(methylphenyl) silane and/or polyphenyl silane.

18. A curable composition, comprising:
    water;
    a polysilane compound comprising a silane repeating unit having a single phenyl group and hydrogen or an alkyl group; and
    a polymerizable particle and/or a polymerizable monomer,
    wherein the polysilane is present in the composition in a range of from 0.1 to less than 0.5 wt. %, and
    wherein, if present, the polymerizable particle is present in composition in a range of from 7 to 10 wt. %.

19. The composition of claim 18, wherein the polymerizable particle is present.

20. The composition of claim 18, wherein the polysilane compound comprises poly(methylphenyl) silane and/or polyphenyl silane.

* * * * *